United States Patent [19]
Tanaka et al.

[11] Patent Number: 5,091,098
[45] Date of Patent: Feb. 25, 1992

[54] SLIDING MATERIAL AND METHOD OF MANUFACTURING THE SAME

[75] Inventors: Tadashi Tanaka, Konan; Hidehiko Tamura, Aichi; Kiyohide Uenaka, Nagoya; Shigemasa Hakakoshi, Aichi, all of Japan

[73] Assignee: Daido Metal Company Ltd., Nagoya, Japan

[21] Appl. No.: 660,823

[22] Filed: Feb. 26, 1991

[30] Foreign Application Priority Data

Feb. 27, 1990 [JP] Japan .................................. 2-046870

[51] Int. Cl.$^5$ ................. C10M 147/02; C10M 147/04
[52] U.S. Cl. .................................... 252/12.2; 252/12; 252/12.4; 252/12.6
[58] Field of Search ....................... 252/12, 12.2, 12.4, 252/12.6

[56] References Cited

U.S. PATENT DOCUMENTS

| | | | |
|---|---|---|---|
| 2,824,060 | 2/1958 | White | 252/12 |
| 4,312,772 | 1/1982 | Mori | 252/12 |
| 4,394,275 | 7/1983 | Bickle et al. | 252/12.2 |
| 4,439,484 | 3/1984 | Mori | 428/318.4 |
| 4,655,944 | 4/1987 | Mori | 252/12 |

FOREIGN PATENT DOCUMENTS

| | | |
|---|---|---|
| 3916950 | 8/1939 | Japan . |
| 103022 | 6/1984 | Japan . |
| 0912793 | 12/1962 | United Kingdom . |

*Primary Examiner*—Margaret Medley
*Attorney, Agent, or Firm*—Browdy and Neimark

[57] ABSTRACT

A sliding material comprising a backing metal having a porous metal layer formed on the surface thereof and a composition for impregnation coating impregnated and coated to the pores and the surface thereof, wherein the composition for impregnation coating is a composition composed of (a) 0.5-30 vol. % of at least one material selected from a group of resins composed of PFA, EPE, and FEP, 5-30 vol % of metal lead having a relative surface area of 1,000-8,500 cm$^2$/g in an average particle size, and the balance composed of PTFE, a total of the respective components other than the PTFE is 5.5-50 vol %, a sliding material comprising a backing metal having porous metal layer formed on the surface thereof and a composition for impregnation coating impregnated and coated to the pores and the surface thereof composed of 0.5-30 vol % of at least one material selected from resins composed of PFA, EPE, and FEP, 5-30 vol % of metal lead having a relative surface area of 1,000-8,500 cm$^2$/g in an average particle size, 0.5-30 vol % of at least one material selected from a filler composed of solid lubricant metal oxide, metal fluoride, graphite, a fiber selected from a ceramic of carbon fiber, glass fiber, and SiC, and the balance composed of PTFE, the respective components other than the PTFE being 6-50 vol %, and a method of manufacturing a sliding material comprising the steps of impregnating and covering the above composition for impregnation coating (a) or (b) to the pores and the surface thereof defined in the porous metal layer formed on the surface of a backing metal, and thereafter baking the backing metal with the above composition for impregnation coating (a) or (b) in a neutral atmosphere or in a reducing atmosphere.

4 Claims, No Drawings

SLIDING MATERIAL AND METHOD OF MANUFACTURING THE SAME

BACKGROUND OF THE INVENTION

1. Technical Field of the Invention

The present invention relates to a sliding material excellent in friction and wear characteristics and a method of manufacturing the same.

The term "sliding material" as used herein is to be understood as a construction including plain bearing or bearing material or self-lubricating material which is suitable for use as antifriction material for producing sliding members, such as bearing bushes, shoes, slide plates, and sliding members used in clutches, brakes, etc., and collectors.

The term "plain bearing or bearing material or self-lubricating material" is to be understood as including a steel backing to which is bonded a layer of porous bronze constituting a matrix in which the porous bronze at least at and adjacent to its exposed surface is impregnated with a mixture of PTFE and lead etc.

2. Prior Art

Conventional sliding materials and methods of manufacturing the same are disclosed, for example, in the following Japanese Patent Kokoku (Post Exam. Publications) and Japanese Patent Application Kokai (Laid-Open) (1), (2),. and (3). The gist thereof lies in a sliding material comprising a backing metal having a porous metal layer formed on the surface thereof in which pores are defined and compositions for impregnation coating are shown below in (1), (2), and (3) impregnated and coated to the pores and the surface thereof.

(1) Japanese Patent Kokoku No. 39-16950 (using, e.g., PTFE-20Pb or PTFE-20PbO in a volume percent as a composition for impregnation coating) (PTFE: polytetrafluoroethylene)

(2) Japanese Patent Kokoku No. 61-52322 (using, e.g., PTFE-20PFA in a volume percent as a composition for impregnation coating) (PFA: tetrafluoroethylene-perfluoroalkylvinylether copolymer)

(3) Japanese Patent Kokai No. 59-103022 (using, e.g., PTFE-10PFA-20Pb in a volume percent as a composition for impregnation coating)

Here, attention must be paid to Japanese Patent Kokai (1) above which discloses coarse lead powder having a mesh of 300 B.S.S as the type of metal lead used as shown in the example on lines 21 and 22 of the right column of page 1. The lead powder has a ratio of surface area to weight of 500 cm$^2$/g, and it is found that lead powder having a very small relative surface area was used. Further, the lead powder used above in (2) and (3) was substantially similar to that used in (1) above, in consideration of the technical level at that time. In addition, the above prior arts (2) and (3) used various kinds of meltable fluorocarbon resins.

A sliding material and a method of manufacturing the same according to the technologies as disclosed in prior arts (1), (2), and (3) in which the very coarse lead powder, i.e., the lead powder having a very small relative surface area and various kinds of meltable fluorocarbon resins used do not satisfy both friction and wear characteristics when the sliding material is slid in a dry state and wear and cavitation proofing characteristics when it is slid under the boundary lubrication or semi-dry lubrication is not satisfactory.

A problem to be solved by the present invention is to determine a size of metal lead and to select a specific fluorocarbon resin to satisfy both of the above characteristics.

SUMMARY OF THE INVENTION

An object of the present invention is to simultaneously satisfy the different friction and wear characteristics of separate conventional inventions in a single material.

As a means for achieving the object of the present invention, there are provided the following sliding materials and methods of manufacturing the same:

(1) A sliding material comprising a backing metal having a porous metal layer formed on the surface thereof in which pores are defined and the following composition for impregnation coating (a) impregnated and coated to the pores and the surface thereof.

The composition for impregnation coating, is a composition composed of:

(a) 0.5–30 vol % of at least one material selected from group A (a meltable fluorocarbon resin) composed of PFA, EPE, and FEP, 5–30 vol % of metal lead having a relative surface area of 1,000–8,500 cm$^2$/g in an average particle size, and the remaining portion substantially composed of PTFE, wherein the total of the respective components other than the PTFE is 5.5–50 vol %.

(2) A method of manufacturing a sliding material comprising the steps of impregnating and covering the composition for impregnation coating (a) described in the above (1) to the pores and the surface thereof defined in the porous metal layer formed on the surface of a backing metal, and thereafter baking the backing metal with the composition for impregnation of coating (a) in a neutral atmosphere or in a reducing atmosphere.

(3) A sliding material comprising a backing metal having a porous metal layer formed on the surface thereof in which pores are defined and impregnation coating (b) impregnated and coated to the pores and the surface thereof.

The composition for impregnation coating, (b) is composed of:

(b) 0.5–30 vol % of at least one material selected from group A (a meltable fluorocarbon resin) composed of PFA, EPE, and FEP, 5–30 vol % of metal lead having a relative surface area of 1,000–8,500 cm$^2$/g in an average particle size, 0.5–30 vol % of at least one material selected from group B (filler) composed of a solid lubricant such as metal oxide, metal fluoride, graphite, and the like, a fiber material such as carbon fiber, glass fiber, and the like, and ceramics such as SiC, and the like, and the remaining portion substantially composed of PTFE, a total of the respective components other than the PTFE being 6–50 vol %.

(4) A method of manufacturing a sliding material comprising the steps of impregnating and covering the composition for impregnation coating (b) described in (3) above to the pores and the surface thereof defined in the porous metal layer formed on the surface of a backing metal, and thereafter baking the backing metal with the composition for impregnation coating (b) in a neutral atmosphere or in a reducing atmosphere.

Note, the respective abbreviations designate the following substances. EPE: fluoroethylene propylene ether resin; and FEP: tetrafluoroethylene-hexafluoropropylene copolymer resin.

DETAILED DISCUSSION

The reason the composition for impregnation coating in a sliding material and method of manufacturing the same according to the present invention have meritorious effects are herein described.

With respect to the above composition for impregnation coating (a), first, it is important to compare the composition (a) with FEP, PFA, ETFE, PVDF, PCTFE, and EPE disclosed as meltable fluorocarbon resins in Japanese Patent Kokai No. 59-103022 as the prior art (3). One of the important characteristics of the present invention is that only PFA, EPE, and FEP of these meltable fluorocarbon resins are found to be well fused together with PTFE and can become polymer alloy.

Next, the limitation of numerical values thereof will be described.

When at least one kind of material selected from the group composed of PFA, EPE, and FEP is less than 0.5 vol %, wear-proofing and cavitation-proofing characteristics are greatly deteriorated. Further, when it exceeds 30 vol %, a coefficient of friction and the friction temperature are increased and heat fluidizes a sliding surface later and thus an amount exceeding 30% is not preferable, although an initial wear-proofing property is improved. As a result, the amount of this material is limited as disclosed. In addition, these meltable fluorocarbon resins are well fused together with PTFE to become polymer alloys and this property is very important to improve cavitation-proofing property in a lubricant, as particularly described in Japanese Patent Kokoku No. 61-52322 and the like. Whereas, the cavitation-proofing property of the composition layer composed of a PTFE matrix is greatly deteriorated by the addition of the metal lead powder having a larger surface area as compared with the weight thereof, as also described as in the composition for impregnation coating (a), it is important that this deterioration is improved by the meltable fluorocarbon resins used to make the polymer alloy together with the PTFE.

When dispersed in PTFE, the metal lead powder has meritorious effects and causes the PTEF to be transferred to and deposited on a mating member (in general, steel or stainless steel) of the sliding material, which is said to provide low friction and wear characteristics. This phenomenon is disclosed in the above Japanese Patent Kokoku No. 39-16950 as a prior art.

Nevertheless, the present invention classified as commercially available metal lead powder (to respective similar sizes) and combining the powder of different sizes in various ways to obtain a ratio of surface area to weight of 5,000 cm$^2$/g in an average particle size, is ten times those of the prior art at 500 cm$^2$/g, and it is found that this powder has greatly reduced friction and is less worn. This is due to the result of that the meritorious effects the above transfer and deposition of PTFE were carried out more finely, more often and effectively.

The reason why a relative surface area is made to 1,000–8,500 cm$^2$/g is that when it is less than 1,000 cm$^2$/g, the friction and wear characteristics are similar to those of the prior arts, and metal powder having a relative surface area exceeding 8,500 cm$^2$/g is difficult to be industrially produced.

An additive amount exceeding 30 vol % is difficult to keep cavitation-proofing property even if a meltable fluorocarbon resin is added. Further, an additive amount less than 5 vol % cannot provide the necessary friction and wear characteristics. Therefore, an additive amount is set from 5-30 vol %. The metal lead powder is made by gas atomizing, water atomizing, and the stamp milling method.

Further, the addition of at least one material selected from a group composed of a solid lubricant such as metal oxide, metal fluoride, graphite, $MoS_2$, $WS_2$, PbS, and the like, a fiber material such as carbon fiber, and the like, and ceramics such as SiC improves the friction and wear characteristics. When, however, the amount of one material selected from the group is less than 0.5 vol %, the addition for improving the friction and wear characteristics results in no effect and thus has no meaning. Further, the addition of one of the above material exceeding 30 vol % makes a sliding material brittle and thus the sliding material cannot be applied to practical use. Thus, the above at least one material must be in a range from 0.5 to 30 vol %.

The metal oxide includes oxides composed of a single material selected from Zn, Al, Sb, Y, In, Zr, Mo, Cd, Ca, Ag, Cr, Co, Ti, Si, Mn, Sn, Ce, W, Bi, Ta, Fe, Cu, Pb, Ni, Te, Nb, Pt, V, Pd, Mg, Li, and composite metal oxides such as CoO $Al_2O_3$, $TiO_2$ $ZnO_2$, PbO $TiO_2$, CoO $SnO_2$, MgO $Al_2O_3$, $ZrO_2$ $SiO_2$, CoO $Al_2O_3$ MgO, CoO $Al_2O_3$ $Cr_2O_3$, CoO ZnO MgO, $Pb_3O_4$ $Sb_2O_3$ $TiO_2$, $Cr_2O_3$ $Sb_2O_3$ $TiO_2$, $Cr_2O_3$ CuO $MnO_2$, CoO $Cr_2O_3$ $Fe_2O_3$, CoO $ZnO_2$ $NiO_2$ $TiO_2$, CoO $Cr_2O_3$ $MnO_2$ $Fe_2O_3$.

The metal fluorides include $PbF_2$, $AlF_3$, $CdF_2$, $BaF_2$, and the like; the fiber material includes natural fiber and artificial fiber such as carbon fiber, glass fiber, cotton (cellulose), asbestos, rockwool, potassium titanate fiber, aromatic polyamide fiber, and the like; and the ceramics includes SiC, TiC, TiN, $B_4C$, BN, $Si_3N_4$, AlN, HfN, TaN, WC, TaC, VC, ZrC and the like.

Note that, the metal lead powder used in the present invention is pure Pb powder which can be metallurgically produced. The metal lead powder has an oxidized extreme surface as generally as in the case of any ordinary metal, but is gray or black when observed from the outside with a melting point of 327° C.

The large metal lead in the surface layer is contained in a composition mainly composed of PTFE, but since the PTFE is composed of small particles in a baking step, the composition has permeability and the metal lead becomes susceptible to oxidation. Therefore, when friction and wear tests were carried out using a sliding member filled with completely oxidized lead, it had a performance and a cavitation-proofing property inferior to those of the sliding member of the present invention. It is supposed that this is because of an inferior wetting property between PTFE and lead oxide.

Therefore, the manufacturing method according to the present invention is characterized in that baking is carried out in a non-oxidizing atmosphere to prevent the sliding member from being partially oxidized.

EXAMPLES

Examples of the present invention will be described below.

Bronze powder was porously sintered on a copper plated steel backing metal and thereafter the compositions for impregnation coating shown in Table 1 were impregnated and coated to the pores and the surface of the above porous bronze layer by passing the backing metal sintered with bronze powder between rolls.

Next, the steel backing metal was baked in a usual atmosphere or in a non-oxidizing atmosphere at a temperature of 327°-400° and further caused to be passed through rolls to be formed to a uniform thickness. Thus, conventional sliding materials (Specimens No. 1-4) and sliding materials of the present invention (Specimens No. 5-17) were obtained.

Table 1 shows the test result of these specimens and Tables 2 and 3 show the test conditions thereof.

Note that the backing metal used in the present invention may be metal other than steel, e.g., stainless steel or copper alloy such as bronze, no plating may be applied between the backing metal and the porous layer, metal other than copper, or alloy may be plated therebetween, and the porous layer formed on the backing metal may be composed of metal or alloy other than copper alloy such as bronze, lead bronze, and the like.

Note that the reason why the baking is carried out in the neutral atmosphere or in the reducing atmosphere is to prevent the lead powder in the composition for impregnation coating from being oxidized in baking.

TABLE 1

| Distinction | Specimen No. | Composition for Impregnation Coating (vol %) | Relative Surface Area of Metal Lead or Lead Oxide (cm²/g) |
|---|---|---|---|
| Conventional Sliding Material | 1 | PTFE-20Pb | 500 |
| | 2 | PTFE-20PbO | 1,500 |
| | 3 | PTE-10PFA | |
| | 4 | PTFE-10PFA-20Pb | 500 |
| Sliding Material of Present Invention | 5 | PTFE-2PFA-20Pb | 5,000 |
| | 6 | PTFE-10PFA-20Pb | 5,000 |
| | 7 | PTFE-20EPE-20Pb | 5,000 |
| | 8 | PTFE-30FEP-20Pb | 5,000 |
| | 9 | PTFE-5PFA-5FEP-5Pb | 3,000 |
| | 10 | PTFE-5PFA-5FEP-10Pb | 3,000 |
| | 11 | PTFE-5PFA-5FEP-20Pb | 3,000 |
| | 12 | PTFE-5PFA-5FEP-30Pb | 3,000 |
| | 13 | PTFE-10PFA-20Pb | 1,000 |
| | 14 | PTFE-10PFA-20Pb | 7,000 |
| | 15 | PTFE-10PFA-5Pb-2PbF₂ | 5,000 |
| | 16 | PTFE-10PFA-10Pb-10 Carbon Fiber | 5,000 |
| | 17 | PTFE-10PFA-20Pb-15PbO TiO₂-3MoS₂ | 5,000 |

| Distinction | Specimen No. | Composition for Impregnation Coating (vol %) | Result of Friction and Wear Tests | |
|---|---|---|---|---|
| | | | Wear Amount (μm) | Friction Coefficient |
| Conventional Sliding Material | 1 | PTFE-20Pb | 50 | 0.143 |
| | 2 | PTFE-20PbO | 45 | 0.195 |
| | 3 | PTFE-10PFA | 80 | 0.270 |
| | 4 | PTFE-10PFA-20Pb | 45 | 0.200 |
| Sliding Material of Present Invention | 5 | PTFE-2PFA-20Pb | 25 | 0.130 |
| | 6 | PTFE-10PFA-20Pb | 23 | 0.133 |
| | 7 | PTFE-20EPE-20Pb | 21 | 0.137 |
| | 8 | PTFE-30FEP-20Pb | 19 | 0.140 |
| | 9 | PTFE-5PFA-5FEP-5Pb | 30 | 0.120 |

TABLE 1-continued

| | 10 | PTFE-5PFA-5FEP-10Pb | 27 | 0.125 |
|---|---|---|---|---|
| | 11 | PTFE-5PFA-5FEP-20Pb | 25 | 0.130 |
| | 12 | PTFE-5PFA-5FEP-30Pb | 23 | 0.133 |
| | 13 | PTFE-10PFA-20Pb | 27 | 0.127 |
| | 14 | PTFE-10PFA-20Pb | 19 | 0.137 |
| | 15 | PTFE-10PFA-5Pb-2PbF₂ | 27 | 0.127 |
| | 16 | PTFE-10PFA-10Pb-10 Carbon Fiber | 24 | 0.129 |
| | 17 | PTFE-10PFA-20Pb-15PbO TiO₂-3MoS₂ | 18 | 0.132 |

| Distinction | Specimen No. | Composition for Impregnation Coating (vol %) | Test Result of Cavitation-Proofing Volume Reduction (mm³) |
|---|---|---|---|
| Conventional Sliding Material | 1 | PTFE-20Pb | 20 |
| | 2 | PTFE-20PbO | 45 |
| | 3 | PTE-10PFA | 2 |
| | 4 | PTFE-10PFA-20Pb | 10 |
| Sliding Material of Present Invention | 5 | PTFE-2PFA-20Pb | 21 |
| | 6 | PTFE-10PFA-20Pb | 15 |
| | 7 | PTFE-20EPE-20Pb | 12 |
| | 8 | PTFE-30FEP-20Pb | 9 |
| | 9 | PTFE-5PFA-5FEP-5Pb | 8 |
| | 10 | PTFE-5PFA-5FEP-10Pb | 10 |
| | 11 | PTFE-5PFA-5FEP-20Pb | 12 |
| | 12 | PTFE-5PFA-5FEP-30Pb | 14 |
| | 13 | PTFE-10PFA-20Pb | 10 |
| | 14 | PTFE-10PFA-20Pb | 19 |
| | 15 | PTFE-10PFA-5Pb-2PbF₂ | 12 |
| | 16 | PTFE-10PFA-10Pb-10 Carbon Fiber | 14 |
| | 17 | PTFE-10PFA-20Pb-15PbO TiO₂-3MoS₂ | 18 |

TABLE 2

Test Conditions of Friction and Wear Tests

| Tester Used | Bush Tester |
|---|---|
| Specimen Size | Inside Dia. 20 mm × Outside Dia. 23 mm × Length 20 mm |
| Load | 50 Kgf/cm² |
| Speed | 0.1 m/sec |
| Time | 500 hours |
| Temperature | Room Temperature |
| Lubrication | none |
| Axis | Soft Steel 220 Hv Surface Roughness 3.0 um Rmax |

TABLE 3

Test Conditions of Cavitation-Proofing Test

| Tester Used | Dedicated Tester for Cavitation |
|---|---|
| Specimen Size | Longitudinal Length 40 × Lateral Length 40 × Thickness 1.5 (mm) |

TABLE 3-continued

| Test Conditions of Cavitation-Proofing Test | |
| --- | --- |
| Resonance Frequency | 19 KHz |
| Output Power | 600 W |
| Liquid Used for Test | Water |
| Temperature of Test Liquid | Room Temperature |
| Gap between Hone and Specimen | 1 millimeter |
| Hone Diameter | 35 millimeters |
| Testing Time | 3 minutes |

As apparent from Table 1, when the conventional sliding materials (Specimens No. 1-4) are compared with the sliding materials of the present invention (Specimens 5-17), the friction and wear characteristics of the latter are greatly improved and the cavitation-proofing property thereof in lubricant is substantially the same as or better than that of the conventional sliding material (Specimen No. 1) without the reduction in volume as a result of the addition of a meltable fluorocarbon resin, in spite of that the metal lead powder having a large relative surface area is added.

As a result, the sliding materials of the present invention can achieve the improvement in the friction and wear characteristics, which is the object of the present invention and very important in the sliding characteristics.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A sliding material comprising: a backing metal; a porous metal layer formed on a surface of said backing metal, and a composition for impregnation coating pores and the surface of said porous metal layer, wherein said composition for impregnation coating comprises:

0.5-30 vol % of at least one meltable fluorocarbon resin material selected from a group consisting of tetrafluoroethylene-perfluoroalkylvinylether copolymer, fluoroethylene propylene ether and tetrafluoroethylene-hexafluoropropylene copolymer, 5-30 vol % of lead metal having a relative surface area of 1,000-8,500 cm$^2$/g in an average particle size, and a remaining portion composed of polytetrafluoroethylene, and wherein a total of components other than the polytetrafluoroethylene is 5.5-50 vol %.

2. A method of manufacturing a sliding material comprising: impregnating and covering the composition for impregnation coating of claim 1 to cover pores and the surface in the porous metal layer formed on the surface of said backing metal, and baking the backing metal with said composition for impregnation coating in a neutral atmosphere or a reducing atmosphere.

3. A sliding material comprising: a backing metal having a porous metal layer formed on the surface thereof and a composition for impregnation coating pores and the surface of the metal layer, wherein said composition for impregnation coating comprises:

0.5-30 vol % of at least one meltable fluorocarbon resin material selected from a group consisting of tetrafluoroethylene-perfluoroalkylvinylether copolymer, fluoroethylene propylene ether and tetrafluoroethylene-hexafluoropropylene copolymer, 5-30 vol % of lead metal having a relative surface area of 1,000-8,500 cm$^2$/g in an average particle size, 0.5-30 vol % of at least one material selected from a filler composed of a solid lubricant of metal oxide, metal fluoride, graphite, a fiber selected from a ceramic of carbon fiber or glass fiber and, SIC and, a remaining portion composed of polytetrafluoroethylene and wherein components other than the polytetrafluoroethylene are 6-50 vol %.

4. A method of manufacturing a sliding material comprising: impregnating and covering the composition for impregnation coating of claim 3 to cover pores and the surface in the porous metal layer formed on the surface of said backing metal and baking the backing metal with said composition for impregnation coating in a neutral atmosphere or a reducing atmosphere.

* * * * *